C. P. CARPENTER.
Horse Rake.
No. 15,601.
Patented Aug. 26, 1856.
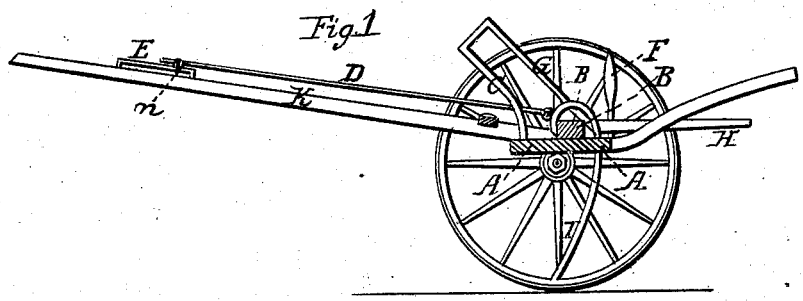
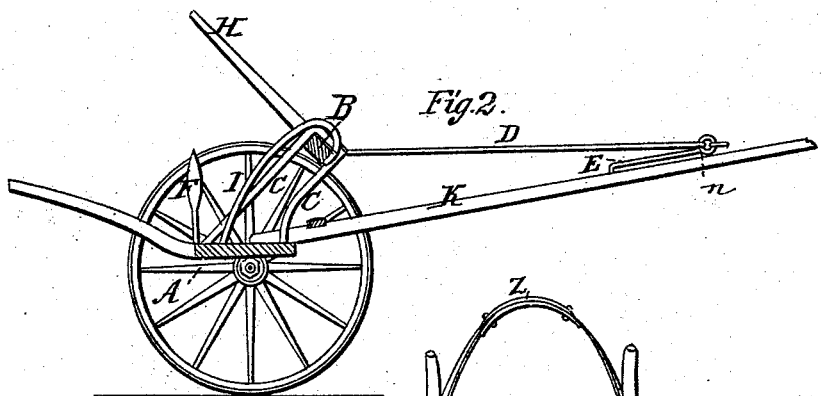
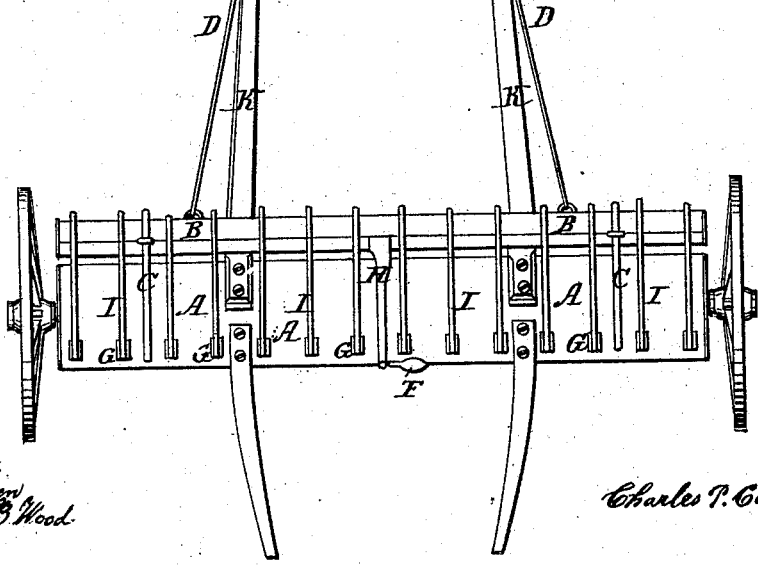

UNITED STATES PATENT OFFICE.

CHARLES P. CARPENTER, OF ST. JOHNSBURY, VERMONT.

IMPROVEMENT IN HAY-RAKES.

Specification forming part of Letters Patent No. 15,601, dated August 26, 1856.

*To all whom it may concern:*

Be it known that I, CHARLES P. CARPENTER, of St. Johnsbury, in the county of Caledonia and State of Vermont, have invented a new and useful Improvement in Horse-Rakes for Hay, Grain, or other Similar Material; and I do declare that the same is fully described and represented in the accompanying drawings, figures, and references thereof.

Figure 1 represents an end view of said horse-rake with my improvement attached, showing said rake (one of the supporting-wheels being removed) with the movable head fastened down, bringing the lower ends of the teeth near to the ground in proper position for gathering the hay. Fig. 2 represents an end of the same as above with the movable head and teeth drawn up in proper position for discharging the hay when gathered; and Fig. 3 represents a plan of the same with the parts in the same position as in Fig. 2, the letters on the drawings referring to similar parts in all the figures.

In the drawings, A represents a bed piece or plank, of suitable dimensions, mounted on wheels in any known way, and having handles and arms attached by which it may be guided or controlled. This bed-plank is pierced with a number of oblong slots, G G, corresponding with the number of the teeth in the rake, and designed to receive said teeth through them, said bed-piece A serving the double purpose of being a support to the other parts and preventing the hay or other material gathered by the teeth from being lifted with said teeth when the same are raised to discharge such hay, and form a windrow.

B B represent a movable head, to which the teeth are attached, resting loosely on the bed-piece A while raking, and held to the guide-rods C C by staples or friction-rollers, so that said head may slide freely up and down on said guide-rods when not kept down to the bed-piece by the catch F.

C C are the guide-rods referred to above, securely fastened to the bed-piece A and set at some convenient angle to the same, as shown, serving to guide the head B in its motion up and down. To this head B are hooked or otherwise attached the tugs D D. The breast-plate Z or collar of the horse is connected to these tugs, so that the whole machine may be drawn by them in the process of raking.

E E are two brackets, one on each arm of the rake, serving to determine the length of the motion of the head B and to transfer the power from the tugs D to the arms K when the operation of the rake requires such transfer, as hereinafter described. The tugs are coupled to these brackets by the links *n n*.

H represents a lever or handle, by which the head B is pressed down to its place on the bed-plank A, the catch F shutting over said handle when in this position and holding the head firmly to the bed-plank, as represented in Fig. 1.

I I represent the teeth of the rake, and they may be attached to the head in any known way.

The operation of this rake will now be understood, as follows: The horse or other power by which the machine is drawn is attached to the loops in the forward ends of the tugs D D, and the several parts of the rake will be in the respective positions represented in Fig. 1, the head B resting on the bed-plank A, the lower ends of the teeth nearly to the ground, and all kept in such positions by the catch F operating on the handle H; but when the teeth are loaded with a sufficient quantity of hay or other material to form a windrow the driver releases the catch F from the handle, when, as the tractive power is applied to the movable head B, said head will be drawn upon the guide-rods C C until its motion is stopped by the links *n n* coming in contact with the forward ends of the brackets E E. This motion of the head on the guide-rods discharges the hay collected by the teeth, thus compelling the horse to perform the labor which heretofore has been done by the driver, the latter (with this improvement) having only to press the head down to its place again on the bed-plank after such discharge.

My improvement consists in constructing the bed-plank A as above described; in the making of the head B, to which the teeth are attached, movable, instead of fixed, as heretofore, so that said head is raised to discharge the teeth of their load by the same power made use of to draw the rake; the use of a catch, F, or an equivalent to hold the head down to the bed-plank when required; the guide-rods C C, and in the connecting the tugs D D to the brackets E E by the links *n n*, by which means, when the links reach the forward ends of said brackets, the tractive power will be transferred from the tugs to the brackets and the rake be drawn by the arms K K, thus preventing the head being raised higher than is necessary to discharge the teeth of their load.

I am aware that a rake has been constructed with a fixed head, (similar to the one I employ,) into which spring-steel teeth are inserted, and drawn by power applied to such fixed head. Therefore I do not claim such a rake-head, nor such spring-teeth. Neither do I claim the wheels, nor the handles by which said rake is guided, nor the arms K K. Neither do I claim the tug (attached to such a fixed head) of itself alone; but What I do claim as my invention, and desire to secure by Letters Patent, is—

The slotted bed-plank A, the movable head B, the guide-rods C C, the catch F, and the connecting of the tugs D D to the brackets E E by the links n n or their equivalent device or devices, arranged substantially as above described, and for the purposes set forth.

In testimony whereof I have hereunto set my hand and seal this 17th day of July, 1856.

CHARLES P. CARPENTER.

Witnesses:
　JAS. Y. GREEN,
　HORACE B. WOOD.